June 7, 1932.                    H. HUEBER                    1,862,086
HORN
Filed March 18, 1931
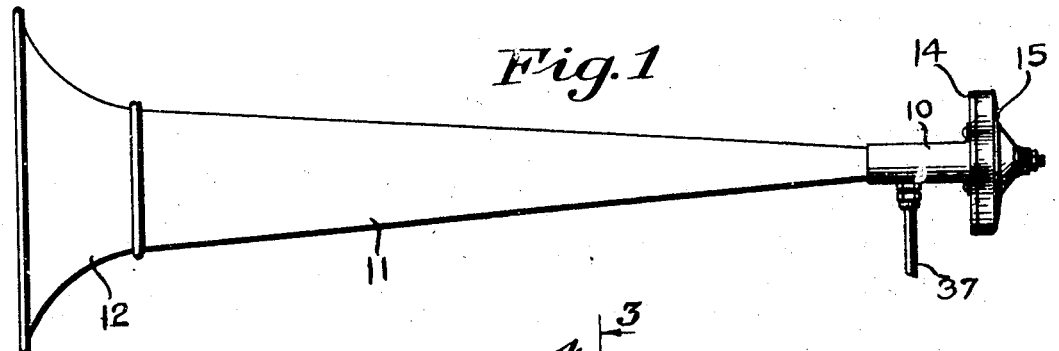
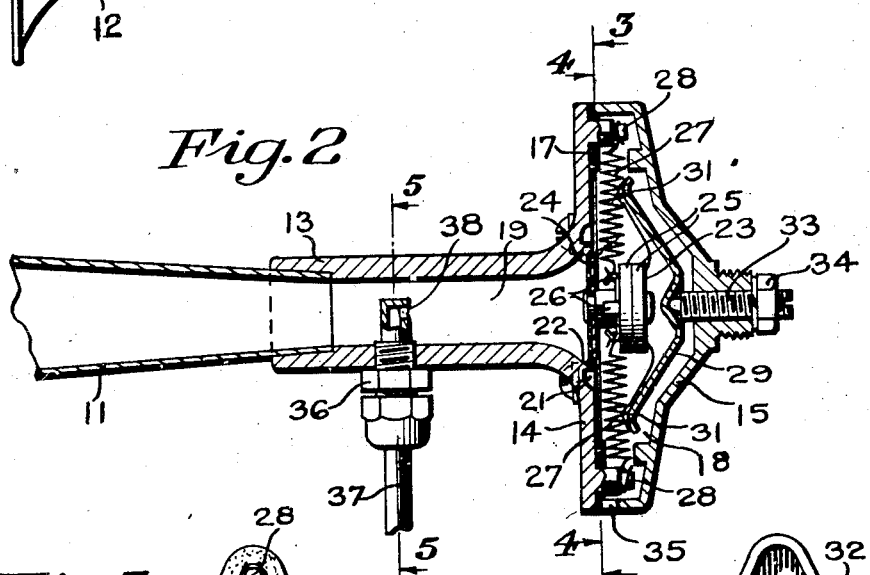
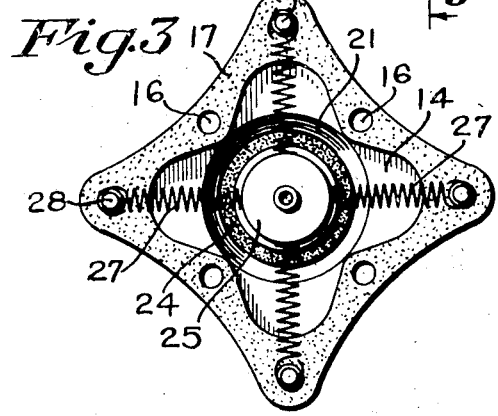
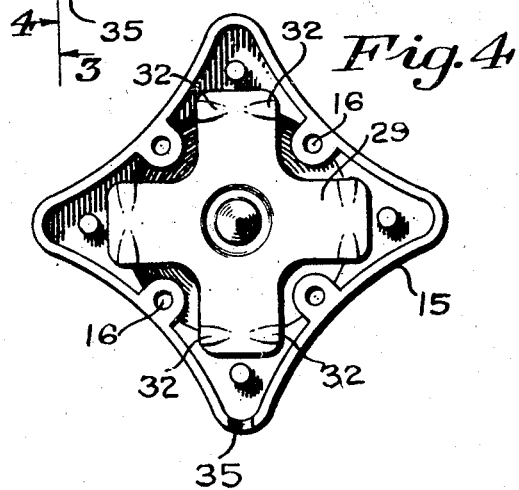
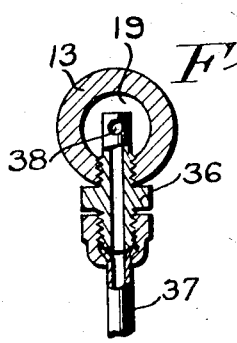
Inventor
Henry Hueber
By Bean, Brooks & Henry.
Attorney Patented June 7, 1932

1,862,086

UNITED STATES PATENT OFFICE

HENRY HUEBER, OF BUFFALO, NEW YORK, ASSIGNOR TO TRICO PRODUCTS CORPORATION, OF BUFFALO, NEW YORK

HORN

Application filed March 18, 1931. Serial No. 523,622.

This invention relates to a fluid pressure operated horn for emitting warning notes or signals, being particularly adapted for motor vehicles such as automobiles, trucks and boats.

More particularly this invention relates to a horn in which the emitted sound waves are set up in a trumpet passage by the action of an oscillatory valve in controlling the passage of discharge of a motivating stream of fluid, the oscillation of the valve being effected by the stream of fluid. Such a construction and arrangement of the parts of the device is contemplated that a stream of fluid under pressure, such as compressed air, may be discharged against the vibratory member to oscillate it from and to a seat provided for it, whereby recurring periods of increased and decreased fluid pressure will be effected within the trumpet passage, resulting in the creation of sound waves having a "pneumatic" quality.

The invention further contemplates a horn device, certain features of which may be adapted to horns operable by a motivating fluid of either greater or less than atmospheric pressure, wherein the oscillatory member is insulated from metal-to-metal contact with its seat in order that the "pneumatic" tone of the device will be free from metallic quality. These and other objects and advantages, including those inherent in the structure and arrangement of the parts of a device incorporating the principles of the invention, will become apparent from the following description of one typical embodiment of the invention, reference being made to the accompanying drawing wherein:

Fig. 1 is a side elevational view of a complete horn unit constructed in accordance with this invention, including a sound producing unit and a trumpet.

Fig. 2 is an enlarged vertical sectional view taken longitudinally through the device of Fig. 1, and showing the sound producing unit and a fragmentary portion of the trumpet.

Figs. 3 and 4 are elevational views taken transversely to Fig. 2 of portions of the sound producing unit as viewed in the manner indicated by lines 3—3 and 4—4, respectively, of Fig. 2.

Fig. 5 is a detail sectional view taken along line 5—5 of Fig. 2.

As shown in Fig. 1, the horn comprises a sound producing unit 10 and a trumpet 11 having an enlarged bell 12 at its outer end. The trumpet is secured to the outer end of a tubular extension 13 of a forward casing section 14 of the sound producing unit or sound box, and is preferably of such size as to enclose an air column which will oscillate in resonance with the sound producing means in the sound box. A rearward casing section 15 is secured to the forward casing section by fasteners that extend through openings 16 which may be disposed about the peripheries of the casing sections. A gasket 17, having openings in registry with the openings 16, may be inserted between the sections 14 and 15 about the peripheries thereof.

The hollow sound box provided by the sections 14 and 15 has a chamber 18 merging into a passage or opening 19 through the extension 13, and communicates through this passage with the trumpet 11. An annular recess 21 is provided on the forward casing section about the line of merger of the passage and chamber, and defines a rigid annular seat 22 for a vibratory sound producing valve 23 which normally closes the passage from the chamber.

The valve may be provided with a non-metallic facing 24, which may comprise a fabric disc, for abutment with the annular seat 22 for preventing metal-to-metal contact. The valve may also be provided with weights 25 for increasing its inertia and radially disposed hook arms 26 for attachment to the inner ends of springs 27 which are radially disposed about the valve for supporting it for oscillatory or vibratory bodily movement from and to the seat 22.

In the illustrated embodiment the forward casing section has projections 28 extending into the chamber 18 through the gasket 17 for supporting the outer ends of the radially disposed springs 27. Means are incorporated in the device for adjusting the degree of pressure which they may exert to urge the valve against its seat. The means illustrated includes a spider 29, which may be stamped from sheet material, and may comprise a plurality of arms 31, each deformed at 32 for engagement with a medial portion of a spring 27. The central portion of the spider may be recessed to rotatably receive the end of an adjusting screw 33, threaded to the rear casing section, by means of which the spider may be adjusted longitudinally of the sound box, being retained in any desired position of adjustment by a lock nut 34.

In the illustrated device, which is operable by fluid under pressure, such as compressed air or exhaust gases from an internal combustion engine, an atmospheric vent or port 35 communicating with the chamber 18 is formed in the sound box. A jet fitting 36, connected to a fluid pressure line 37 in communication with a source of fluid pressure greater than atmospheric, is threaded into the extension 13, as depicted in Figs. 2 and 5. The jet has a discharge opening 38, preferably coaxial with the passage 19, for discharging a stream of fluid under pressure against the valve 23.

In operation fluid discharging from the jet opening 38 will impinge against the valve 23, causing it to unseat against the urge of the springs 27, and, after unseating the valve, may pass through the annular recess 21 into the chamber 16 and exhaust through the port 35 into the outside atmosphere. After the valve has reached open position the fluid pressure against its forward face will be decreased, more nearly approaching the pressure maintaining in the chamber 18 against the rear face of the valve, and the spring 27 will urge the valve forwardly to seated position so that the fluid discharging from the jet will be unable to flow into the chamber 18 until the valve is again unseated, which will occur when the fluid pressure differential between that against its forward and against its rearward faces again becomes sufficient to overcome the valve closing urge of the springs. This recurring action will effect the oscillation of the fluid or air column in the passage 19 and in the trumpet 11, of which the passage 19 comprises a part, to produce the effect of sound. It is preferred that the fluid column within the trumpet passage be of such size as to oscillate in resonance with the oscillations set up by the sound producing unit.

It will be understood that the sound waves set up in this manner will be of a "pneumatic tone" being created by the recurring opening and restricting of the passage of a discharging fluid stream, as distinguished from the harsher and more metallic tones which may be produced by setting a metallic disc or the like into vibration as in the conventional electric motor or vibrator types of horn. The valve 23 will move bodily from and toward its seat, the frequency of such oscillation and of the sound waves caused by this action being controllable by variations of the inertia of the weights 25, which may form a part of it, and by the tension of the springs 27, which may be varied by adjusting the spider 29 through the agency of the adjusting screw 33. The facing 24 of the valve may prevent metal-to-metal contact of the valve against its seat and may thus insure the absence of metallic quality in the sound produced by the device. The spring supporting projections formed upon the casing section, and extending through the sealing gasket 17, provides an efficient and economical manner of supporting the springs.

It will further be understood that the device specifically described and illustrated herein, is merely an exemplification of the principles of the invention, which may be incorporated in other sound producing devices.

What is claimed is:

1. In combination with a source of fluid pressure greater than atmospheric pressure, a hollow casing having a chamber with an exhaust opening communicating with the atmosphere, said casing having an inlet opening establishing communication between the atmosphere and the chamber, a seat formed in said chamber about the inlet opening, a sound wave generator normally engaging the seat to close the passage therebetween, a trumpet connected to the chamber inlet opening, means for resiliently supporting the sound wave generator against the seat whereby the generator may be seated and unseated, and means in communication with said source of greater than atmospheric pressure for directing a stream of air under pressure through said inlet opening and against said sound wave generator, whereby the latter may be caused to seat and unseat and whereby sound waves may be set up within said inlet opening and said trumpet.

2. A horn comprising a hollow casing having a chamber provided with an opening, a trumpet connected to the casing and communicating with the opening, a vibratory valve in said chamber and normally seated to close said chamber from said opening, means for resiliently supporting said vibratory valve for unseating and seating movement, and means for directing a stream of fluid through said opening against said vibratory valve for effecting repeated unseating and seating of said valve, whereby a column of fluid in said trumpet and opening may be set into sound creating oscillation.

3. A horn comprising a hollow casing having a chamber provided with an opening communicating with the outside atmosphere, said casing having a second opening, a seat in the chamber about one of said casing openings, a valve normally engaged with the seat, resilient means attached to said valve for supporting the valve for bodily movement from and to its seat, and a jet for discharging a stream of fluid through said second opening against said valve.

4. A fluid operated horn comprising a hollow sound box provided with a chamber and a tubular projection defining a trumpet passage communicating with the chamber through a port, a second port in said casing, a vibratory valve for successively opening and closing one of the ports for generating sound, resilient means for supporting the valve within the chamber, and a jet disposed within said trumpet passage for discharging through said first named port against said vibratory valve.

5. A fluid operated horn comprising a hollow sound box having a chamber and a pair of ports in communication with the chamber, one of said ports having a sound emitting passage, a vibratory valve resiliently mounted in said chamber and normally seating to close one of said ports, and a jet discharging in the sound emitting passage and through said one of said ports for effecting vibratory movement of the valve from and to its seat.

6. A fluid operated horn comprising a multi-section sound box provided with a chamber, one of the sections thereof having a tubular extension defining a passage extending into communication with said chamber, said section having a seat about said passage and extending into said chamber, a valve resiliently mounted in said chamber and normally seating against said seat, and a jet extending through said casing extension and having a discharge opening disposed substantially axially of said passage for discharging against said valve, whereby the latter may be moved from and to its seat to effect sound pulsations.

7. A fluid operated horn comprising a pair of casing sections defining a chamber, one of the sections thereof having a passage extending substantially co-axially of the sound box and chamber into the latter, a valve in said chamber normally seating to close said passage, a plurality of springs radially disposed about the valve and at their inner ends supporting the valve, a gasket disposed between the casing sections about the peripheries thereof, and a plurality of projections extending from one of said sections into said chamber and supporting the springs at their outer ends.

8. A fluid operated horn comprising a hollow casing having a chamber provided with an opening connectible to a source of operating pressure, said casing having a second opening, a seat in the chamber about one of said casing openings, a valve normally engaged with the seat, and resilient means for supporting the valve for bodily movement from and to its seat, said valve having a non-metallic face for abutment with said seat.

9. A sound generating valve for a horn having a valve seat, comprising a weighted body provided with means for attaching valve supporting members, and a non-metallic facing secured to said body for seating engagement with the valve seat.

HENRY HUEBER.